United States Patent
Kim et al.

(10) Patent No.: US 9,547,228 B2
(45) Date of Patent: Jan. 17, 2017

(54) METHOD OF CORRECTING IMAGE-OVERLAPPED AREA, RECORDING MEDIUM AND EXECUTION DEVICE

(71) Applicant: CJ CGV CO., LTD., Seoul (KR)

(72) Inventors: Hwan Chul Kim, Seoul (KR); Su Ryeon Kang, Goyang-si (KR); Ji Hyung Kang, Hwaseong-si (KR)

(73) Assignee: CJ CGV CO., LTD., Seoul (KR)

( * ) Notice: Subject to any disclaimer, the term of this patent is extended or adjusted under 35 U.S.C. 154(b) by 104 days.

(21) Appl. No.: 14/455,111

(22) Filed: Aug. 8, 2014

(65) Prior Publication Data

US 2015/0054848 A1 Feb. 26, 2015

(30) Foreign Application Priority Data

Aug. 26, 2013 (KR) .................... 10-2013-0101354

(51) Int. Cl.
*G03B 37/04* (2006.01)
*G06F 3/14* (2006.01)
*G09G 3/00* (2006.01)
*G09G 5/02* (2006.01)
*H04N 9/31* (2006.01)

(52) U.S. Cl.
CPC ............. *G03B 37/04* (2013.01); *G06F 3/1446* (2013.01); *G09G 3/003* (2013.01); *G09G 5/026* (2013.01); *H04N 9/3147* (2013.01); *H04N 9/3182* (2013.01); *G09G 2320/0666* (2013.01); *G09G 2320/0686* (2013.01); *G09G 2320/0693* (2013.01); *G09G 2340/12* (2013.01); *G09G 2360/04* (2013.01)

(58) Field of Classification Search
CPC .................. G06F 3/1446; G09G 3/003; G09G 2320/0666; G09G 2320/0686; G09G 2320/0693; G09G 2340/12; G09G 2360/04; G09G 5/026; G03B 37/04
See application file for complete search history.

(56) References Cited

U.S. PATENT DOCUMENTS

| 6,618,076 | B1 * | 9/2003 | Sukthankar | H04N 5/74 |
| | | | | 345/156 |
| 2002/0057279 | A1 * | 5/2002 | Jouppi | G06T 3/4038 |
| | | | | 345/619 |

(Continued)

FOREIGN PATENT DOCUMENTS

| JP | 2002116500 A | 4/2002 |
| JP | 2003274319 A | 9/2003 |

(Continued)

OTHER PUBLICATIONS

Korean Office Action for application No. 10-2013-0101354 dated Aug. 20, 2014.

(Continued)

*Primary Examiner* — Jonathan M Cofino
(74) *Attorney, Agent, or Firm* — Hauptman Ham, LLP (57) ABSTRACT

An image correction method is disclosed. The method includes at least: identifying an overlapped area in an image projected by a plurality of projectors; determining a difference of at least any one of brightness and color of the overlapped area and a non-overlapped area of the image; and adjusting a factor among the brightness and the color in which the difference is generated.

12 Claims, 6 Drawing Sheets

(56) References Cited

U.S. PATENT DOCUMENTS

| | | | |
|---|---|---|---|
| 2002/0122113 A1* | 9/2002 | Foote | G06T 3/4038 348/48 |
| 2002/0180727 A1* | 12/2002 | Guckenberger | G06T 11/60 345/418 |
| 2005/0206857 A1* | 9/2005 | Yamada | G03B 21/56 353/94 |
| 2006/0181685 A1* | 8/2006 | Hasegawa | G03B 37/04 353/69 |
| 2007/0188719 A1 | 8/2007 | Jaynes et al. | |
| 2009/0027416 A1* | 1/2009 | Barone | G06T 11/001 345/611 |
| 2009/0279001 A1 | 11/2009 | Miyazawa et al. | |
| 2010/0201894 A1* | 8/2010 | Nakayama | G03B 21/00 348/745 |
| 2010/0259569 A1* | 10/2010 | Inuzuka | G09G 3/3611 345/690 |
| 2011/0116707 A1* | 5/2011 | Kim | G06K 9/00221 382/154 |
| 2011/0199372 A1* | 8/2011 | Porter | G06T 7/2046 345/419 |
| 2011/0316721 A1 | 12/2011 | Chen | |
| 2012/0038794 A1* | 2/2012 | Kumagai | H04N 5/3572 348/234 |
| 2012/0075353 A1* | 3/2012 | Dong | H04N 5/58 345/690 |
| 2013/0083014 A1* | 4/2013 | Park | H04N 13/0422 345/419 |
| 2013/0162688 A1 | 6/2013 | Matsuoka et al. | |
| 2013/0176542 A1 | 7/2013 | Abele et al. | |
| 2013/0215138 A1 | 8/2013 | Suzuki | |

FOREIGN PATENT DOCUMENTS

| | | |
|---|---|---|
| JP | 2004507954 A | 3/2004 |
| JP | 2011188404 A | 9/2011 |
| JP | 2011211276 A | 10/2011 |
| JP | 2011217304 A | 10/2011 |
| JP | 2011217305 A | 10/2011 |
| JP | 2012003041 A | 1/2012 |
| JP | 2012154984 A | 8/2012 |
| KR | 1020050062579 A | 6/2005 |
| KR | 1020120020793 A | 3/2012 |

OTHER PUBLICATIONS

International Search Report for PCT/KR2014/007576 dated Nov. 20, 2014.

* cited by examiner

METHOD OF CORRECTING IMAGE-OVERLAPPED AREA, RECORDING MEDIUM AND EXECUTION DEVICE

CROSS REFERENCE TO RELATED APPLICATION

This application claims the priority of Korean Patent Application No. 10-2013-0101354, filed on Aug. 26, 2013 in the KIPO (Korean Intellectual Property Office) which is incorporated herein by reference in its entirety.

TECHNICAL FIELD

The present invention relates to an image processing method, and more specifically, to an image correction method for providing an image having a sense of unification overall by correcting an overlapped area in the images projected by a plurality of projectors.

BACKGROUND ART

Conventionally, in order to play back an image such as a movie, advertisement or the like in a theater, a two-dimensional image is projected on a single screen placed on the front side of the theater. However, the audience has no choice but to watch only the two-dimensional (2D) image in such a system.

Recently, techniques related to 3D images have been developed to provide images having a sense of depth to the audience, and the 3D image techniques use a principle of feeling a sense of depth even from a planar image if different images respectively enter left and right eyes of a person and merge together in the brain, in which two cameras having different polarized light filters are used when an image is taken, and a user wears glasses or the like having polarized light filters when watching the image so that different images may enter the left and right eyes.

However, although the 3D techniques may provide images having a sense of depth to users, there is a limit in that it is difficult to be absorbed in the image itself since it is merely watching an image played back on a single screen. In addition, there is also a limit in that the direction of the sense of depth felt by the audience is restricted to the direction where the single screen exists. In addition, since the conventional 3D techniques require the audience to wear glasses or the like having polarized light filters when watching an image, it is inconvenient for the audience who watch the image, and since different images are artificially and forcibly injected into the left and right eyes, sensitive audience may feel dizzy or nausea.

Figure 1:
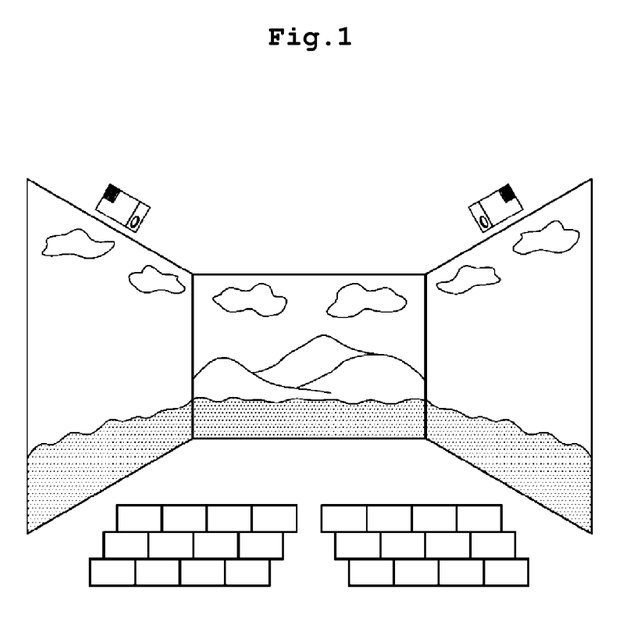
FIG. 1 is a view showing an example of a structure of a multi-projection system.

Accordingly, a so-called 'multi-projection system' which can solve the problems of the conventional projection system based on a single screen has been proposed, and the 'multi-projection system' mentioned here means a technique capable of providing a sense of depth and a sense of immersion to the audience by arranging a plurality of projection surfaces around the audience seats and playing back an image having a sense of unity on the plurality of projection surfaces. In addition, a 'multi-projection theater' means a theater in which the 'multi-projection system' is constructed. FIG. 1 shows an example of the multi-projection system.

In order to effectively operate the 'multi-projection system', a technique capable of effectively correcting images projected on a plurality projection surfaces is needed. It is since that in the 'multi-projection system', a plurality of images projected on a plurality of projection surfaces, not on a single projection surface, should be integratedly corrected, and the method of correcting a plurality of images should be changed as the structure of a theater changes, and, therefore, an image correction process is very complicated, and an error is highly probable to occur. Accordingly, techniques which can help the image correction process of the 'multi-projection system' are required.

Meanwhile, in addition to the multi-projection system, there are some cases in which images are projected on a single projection surface using a plurality of projectors. For example, there are some cases in which a projection surface is too wide or a horizon-to-vertical ratio of a projection surface is not covered by one projector.

When an image should be projected using a plurality of projectors, it is very important to provide an image having a sense of unity. Particularly, an image should be corrected so that boundaries of images projected by the projectors or overlapped and non-overlapped areas cannot be distinguished.

DISCLOSURE OF INVENTION

Technical Problem

Therefore, the present invention has been made in view of the above problems, and it is an object of the present invention to play back images projected by a plurality of projectors to have a sense of unity when an image is projected using the plurality of projectors.

Particularly, it is an object of the present invention to lower a sense of difference between an overlapped area and a non-overlapped area by controlling various factors of the images projected in an image-overlapped area.

Technical Solution

To accomplish the above objects, according to one aspect of the present invention, there is provided an image-overlapped area correction method including the steps of: identifying an overlapped area in an image projected by a plurality of projectors; determining a difference of at least any one or more of brightness and color of the overlapped area and a non-overlapped area of the image; and adjusting a factor among the brightness and the color in which the difference is generated.

Here, at the identification step, an area on a projection surface on which images are overlapped is calculated using image projection area information of each projector stored or calculated in a master device which controls a plurality of projectors, and any one or more of coordinates of an area in which images are overlapped and an overlapped degree of the area are calculated.

In an embodiment of the present invention, at the determination step, a difference of brightness between the overlapped area and the non-overlapped area may be determined, and at the adjustment step, brightness of the overlapped area or the non-overlapped area may be adjusted based on a brightest overlapped area, and, at this point, at the determination step, the difference of brightness may be determined based on an image in which an RGB value of a color is smaller than a predetermined number.

In an embodiment of the present invention, at the determination step, the difference is determined for each frame or pixel of an image.

In an embodiment of the present invention, the adjustment step includes the steps of: providing a user with a value resulting from the determination step; and adjusting at least any one of the brightness and the color of the image according to an adjustment command received from the user, and in another embodiment of the present invention, at the determination step, a difference of at least any one of brightness and color of the overlapped area and the non-overlapped area may be calculated for each frame, and at the adjustment step, an image projected on a relatively dark area may be compensated with the difference of brightness or the difference of image using a result calculated for each frame.

Meanwhile, in another embodiment of the present invention, at the adjustment step, a blur filtering may be applied at a boundary between the overlapped area and the non-overlapped area.

In an embodiment of the present invention, at the adjustment step, a transparency variable may be reflected in an image projected on the overlapped area by each projector, and a chromatic aberration variable may be further reflected in addition to the transparency variable.

In an embodiment of the present invention, the correction method may further include the steps of: determining distortion of color according to the adjustment of brightness; and re-adjusting brightness of the overlapped area or the non-overlapped area according to the distortion.

The present invention includes a computer-readable recording medium in which a program for performing the method of correcting an image-overlapped area described above is recorded and also includes an apparatus for executing the program for performing the method of correcting an image-overlapped area.

Advantageous Effects

According to the present invention, when an image is projected using a plurality of projectors, an image having a sense of unity and unification overall can be played back. Particularly, a sense of difference between an overlapped area and a non-overlapped area can be lowered by controlling various factors of the images projected in an image-overlapped area.

BEST MODE FOR CARRYING OUT THE INVENTION

Hereinafter, the present invention will be described in detail with reference to the accompanying drawings.

Figure 2:
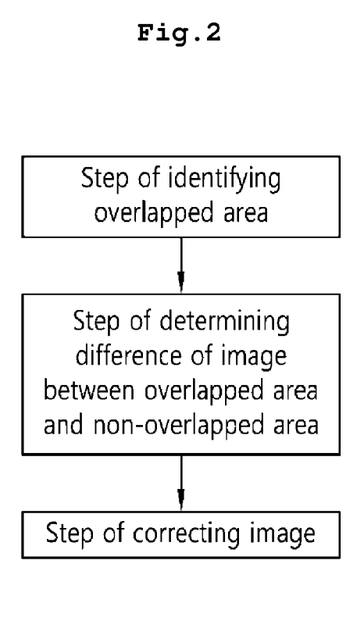
FIG. 2 is a flowchart illustrating an embodiment of the present invention.

FIG. 2 is a flowchart illustrating an embodiment of the present invention. An image-overlapped area correction method of the present invention includes the steps of: identifying an overlapped area between images projected by a plurality of projectors, determining a difference of at least brightness or color of the overlapped area or a non-overlapped area, and adjusting a factor among the brightness and the color in which the difference is generated.

In order to identify an overlapped area between images, a point of a projection surface on which an image projected by each projector is projected should be confirmed first. To this end, in an embodiment of the present invention, each projector projects a reference image in which a predetermined pattern (e.g., a lattice pattern) is formed, and a point of the projection surface on which the reference image is projected is determined. Then, if coordinates of the point on which the reference images projected by the projectors are overlapped are acquired, it may be grasped positions of overlapped areas and non-overlapped areas on the projection surface, and it may be grasped which parts of the image corresponds to the overlapped areas. In order to easily grasp an overlapped area, only different colors may be used for the reference images projected by the continuously arranged projectors, while the shapes of the reference images are the same.

In another embodiment, an area of a projection surface on which images are overlapped can be calculated by using image projection area information of each projector stored or calculated in a master device which controls a plurality of projectors. The image projection area information, which is information on an area of a projection surface on which each projector projects an image, can be previously calculated or stored in the master device which executes the method of correcting an image-overlapped area of the present invention. Accordingly, a position, coordinates or the like of the area on which images projected by a plurality of projectors are overlapped can be acquired based on the image projection area information, and the number of projectors projecting images on a specific overlapped area (a degree of overlap) may also be calculated.

Figure 6:
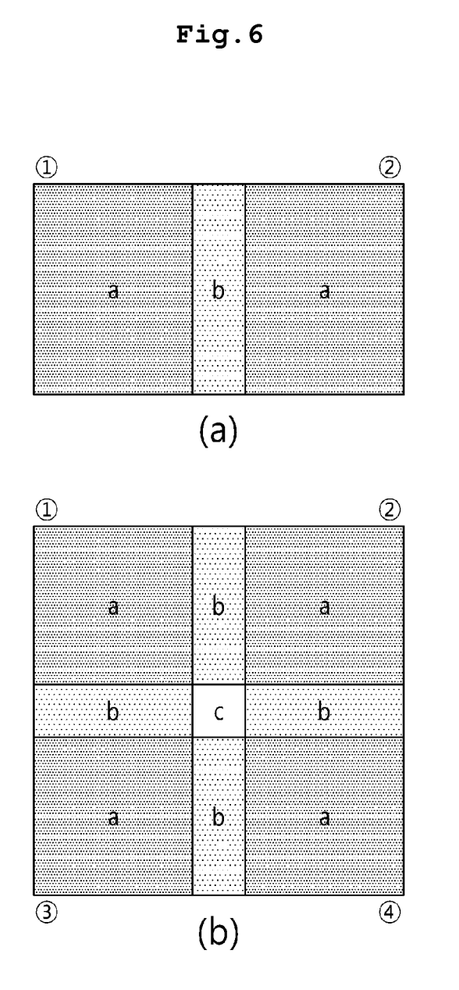
FIG. 6 is a view showing difference of brightness between an overlapped area and a non-overlapped area.

FIG. 6 is a view showing difference of brightness between an overlapped area and a non-overlapped area. FIG. 6(a) shows an example of projecting images by two projectors 1 and 2, in which 'a' corresponds to a non-overlapped area, and 'b' corresponds to an overlapped area. Coordinates based on projection surfaces of an overlapped area and a non-overlapped area can be obtained or coordinates based on an image projected on a corresponding position can be obtained in a method described above or a method which will be described below.

FIG. 6(b) is a view showing an example of projecting images by four projectors 1 to 4, in which 'a' denotes a non-overlapped area, 'b' denotes an area on which images are overlapped by two projectors, and 'c' denotes an area overlapped by four projectors. Although classification of a non-overlapped area and an overlapped area is important, the number of projectors projecting images on an overlapped area is very important in embodying the present invention. It is since that a degree of correction varies according to a degree of overlapping images. Referring to FIG. 6, an overlapped area is displayed relatively brighter than a non-overlapped area, and it is brighter since overlapped colors are expressed or the amount of light increases as the images are overlapped further more. An embodiment of the present invention considering such a point will be described below.

After identifying an overlapped area and a non-overlapped area and acquiring coordinates of each area on the projection surface, coordinates on a projector and the like, difference of brightness, color or the like generated between the overlapped area and the non-overlapped area of an image is determined.

As an embodiment of determining difference of brightness in the present invention, an amount of light projected at a specific time point (a specific frame) while playing back the image is extracted for each pixel. This can be extracted by analyzing the image or by checking the amount of light for each area (an overlapped area or a non-overlapped area) of the entire image projected on the projection surface.

After determining the amount of light at each pixel of each frame of an image, brightness of the overlapped area or the non-overlapped area is adjusted based on the brightest overlapped area.

The present invention is applied at a time point when particularly a dark image or a black image is projected.

In order to express a black color in an image, a projector should not project any color (values of R, G and B are zero) and should not project any light. However, since the projector should project ever-changing colors and light for each pixel, the light and the color cannot be completely blocked in expressing a black color, and a tiny amount of light is output.

Although the amount of light output on the projection surface is very small at the time point of expressing a black color, since an environment of a projector for projecting an image is a dark area in most cases (e.g., a movie theater), pupils of a person are in an opened state, i.e., a state capable of sensing even a tiny difference of brightness. If brightness of light is added to an overlapped area, the difference between the overlapped area and a non-overlapped area is as large as to be recognizable by the person.

As described above, since the light generated by a projector when a dark (black) image is projected is unavoidable and the amount of light cannot be reduced, in the present invention, brightness of the overlapped area or the non-overlapped area is adjusted based on the brightest overlapped area. That is, brightness of the other area is adjusted to be increased with respect to the brightest area.

In order to determine whether or not a currently projected image is a dark image, in the present invention, information on the RGB of a specific pixel of a specific frame is acquired, and it is determined whether or not the acquired RGB information or a sum of the information is smaller than a predetermined number. Since a black color is expressed if the RGB values are closer to zero, a dark area of an image can be identified by analyzing the RGB values of each pixel of each frame in an image.

In the present invention, the step of adjusting a factor among the brightness and the color in which a difference is generated is embodied in a method described below.

Figure 3:
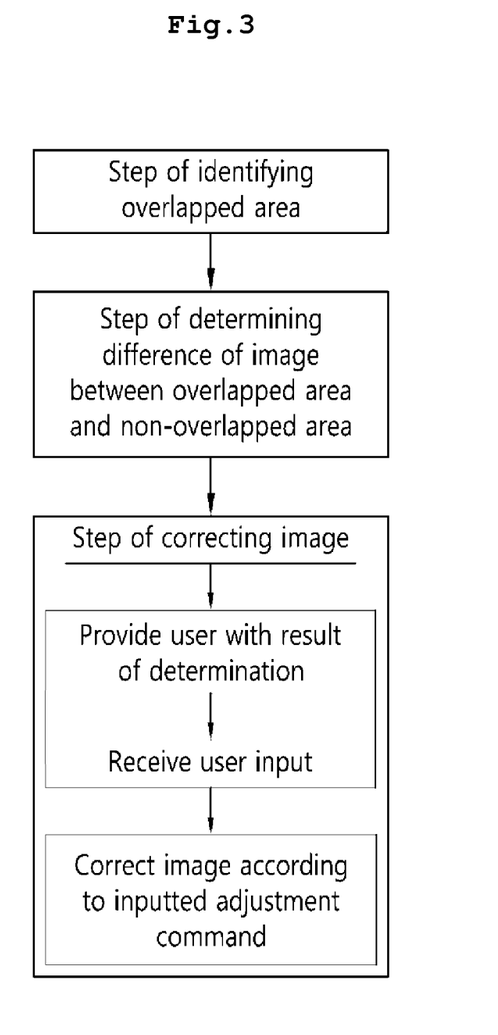
FIG. 3 is a flowchart illustrating another embodiment of the present invention.

Describing an embodiment with reference to FIG. 3, a user is provided with information on the difference of brightness between an overlapped area and a non-overlapped area grasped in the determination step. The correction method of the present invention is used so that an overlapped area and a non-overlapped area may not be distinguished by the eyes of a person. Accordingly, information on the brightness is provided to a user through an interface formed so as to be confirmed by the user, and, based on this, at least any one of the brightness and the color of an image is adjusted according to an adjustment command input from the user.

A user interface for providing a user with a value resulting from the determination and receiving an adjustment command from the user can be provided. Coordinates of a projection surface projected by a plurality of projectors, overlapped and non-overlapped areas, brightness of each pixel in each area and the like can be displayed, and information on the brightness, the color and the like in a specific area of a projection surface can be provided so that the user may visually confirm the information. The user may control the brightness or the like by adjusting an adjustment command input means arranged on the right side while confirming the screen (user interface). Therefore, an image in an image-overlapped area can be corrected.

If an adjustment command described above is input, the adjustment step of the present invention adjusts brightness of each pixel by the [mathematical expression 1] shown below.

$R(x,y)=R_0(x,y)+\text{Offset}(x,y)$ $G(x,y)=G_0(x,y)+\text{Offset}(x,y)$ $B(x,y)=B_0(x,y)+\text{Offset}(x,y)$   [Mathematical expression 1]

In the [mathematical expression 1], (x, y) means a specific position, i.e., coordinates, of an image projected by a projector, $R_0(x, y)$ means RGB values at (x, y) before correction, Offset(x, y) means a correction value of color or brightness at (x, y), and R(x, y) means RGB values at (x, y) after the color or the brightness is corrected.

Figure 4:
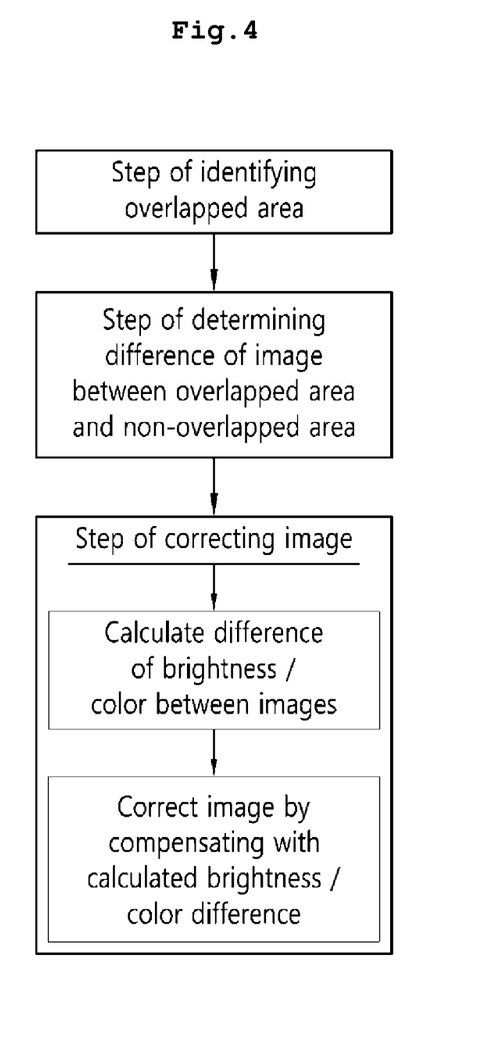
FIG. 4 is a flowchart illustrating another embodiment of the present invention.

In the present invention, another embodiment of the step of adjusting a factor among the brightness and the color in which a difference is generated is described with reference to FIG. 4.

In this embodiment, a difference of brightness or color between an overlapped area and a non-overlapped area is calculated for each frame and for each pixel of a frame. Values of information on the light amount or the color (R, G, B) of an image projected at a specific time point (specific frame) is extracted for each pixel from the information on the difference of brightness or color (related content is described above). If information on the color or the light amount extracted for each frame and for each pixel is calculated together with coordinates of an overlapped area and a non-overlapped area, i.e., if information on the color and the light amount of a pixel belong to an overlapped area and information on the color and the light amount of a pixel belong to a non-overlapped area are calculated and a difference thereof is obtained, a difference between the overlapped area and the non-overlapped area can be derived.

If the derived difference is added to the non-overlapped area or a relatively dark overlapped area, an image-overlapped area can be corrected.

Meanwhile, in an embodiment of the present invention, since a blur filtering is applied in adjusting the brightness or the color, the brightness or the color continuously changes at the boundaries of the overlapped area and the non-overlapped area, and, as a result, a sense of difference can be reduced at the boundaries, and an overall integrated image can be played back.

In an embodiment of the present invention, the adjustment step reflects a transparency variable α in an image projected on an overlapped area by each projector. This is to correct brightness or color distorted by overlapping. For example, if a certain pixel in an overlapped area is projected to be overlapped three times by the images projected by three projectors, colors of the projectors are added, and thus an image is played back to be three brighter than an original image. In order to prevent this phenomenon, an image projected by each projector is reduced to one third of an original image, and thus an image of the original brightness can be displayed. At this point, the one third is referred to as a transparency variable α. However, setting the transparency variable to one third described above is merely an example, and setting and applying a transparency variable is as shown in [mathematical expression 2].

$$C=\Sigma\alpha_i * C, \Sigma\alpha_i=1,$$ [Mathematical expression 2]

(C denotes a color finally express in each pixel, and α is a transparency variable at each pixel)

Describing the [mathematical expression 2] through another example, if it is assumed that an i-th projector and a j-th projector are overlapped left and right by halves, the value of $\alpha_i$ of projector i positioned on the left side is decreased from one to zero in the overlapped area, and the value of $\alpha_j$ of projector j positioned on the right side is increased from zero to one in the overlapped area. That is, the value of α of each pixel of each projector is close to zero as the pixel is close to the boundary of the overlapped area, and if a condition of $\alpha_i+\alpha_j=1$ is satisfied in the overlapped area, distortion of color caused by image overlapping can be corrected.

Meanwhile, in addition to the embodiment described above, the present invention may further reflect a chromatic aberration variable, in addition to the transparency variable. The chromatic aberration variable is a variable for correcting generation of chromatic aberration according to the transparency variable.

As a result of performing a simulation for correcting distortion of an image in an overlapped area according to the aforementioned embodiment, although the image is properly corrected in most of the areas, a phenomenon generating chromatic aberration is found as the transparency variable α approaches zero.

In order to solve this problem, the image is corrected by further reflecting a chromatic aberration variable in addition to the transparency variable α. As a chromatic aberration variable, $(1-\alpha)$ can be set to have a negative correlation with the transparency variable. However, this is merely an example, and a variety of variables can be set as a chromatic aberration variable in order to re-correct distortion of chromatic aberration generating when the transparency variable is small.

In another embodiment of the present invention, a step of determining distortion of color according to the adjustment of brightness and a step of re-adjusting brightness of an overlapped area and a non-overlapped area according to the distortion may be further included after the adjustment step. As described above, it is preferable to apply this embodiment when an image of a bright color is expressed in corresponding brightness as is even after the brightness is adjusted in an image in which adjustment of brightness is needed, i.e., in a dark area or a black area of the image, as described above.

Brightness adjusted based on a dark image may rather distort a color in a bright image. Accordingly, a step of determining distortion of color according to the adjustment of brightness and re-adjusting brightness of an overlapped area or a non-overlapped area according to a degree of distortion is further included in this embodiment. A specific method of determining distortion of color and re-adjusting brightness or the like is the same as that of the embodiment described above.

This embodiment can be expressed as [mathematical expression 3] shown below.

$$R(x,y)=R_0(x,y)+\text{Offset}(x,y)*[(255-R_0(x,y))/255]^n$$

$$G(x,y)=G_0(x,y)+\text{Offset}(x,y)*[(255-R_0(x,y))/255]^n$$

$$B(x,y)=B_0(x,y)+\text{Offset}(x,y)*[(255-R_0(x,y))/255]^n$$ [Mathematical expression 3]

Display of RGB colors is determined between 0 and 255, and as an RGB value approaches 255, a bright color close to red, green or blue is rendered. Therefore, according to the mathematical expressions shown above, if a color is brighter and an RGB value is larger, the value of $[(255-R_0(x,y))/255]^n$ decreases. As a result, the value of $[(255-R_0(x,y))/255]^n$ also decreases, and a degree of correction at the point (x, y) also decreases. As is mentioned above, the brightness is re-adjusted in the direction of reducing distortion of an image according to the adjustment of brightness.

n is an integer which can be selected as needed, and, as a result of experiment, it can be confirmed that an image is re-corrected to a proper level when n is 20. However, this is merely an example of experiment, and the present invention is not limited to [mathematical expression 3] and the n value.

Figure 5:
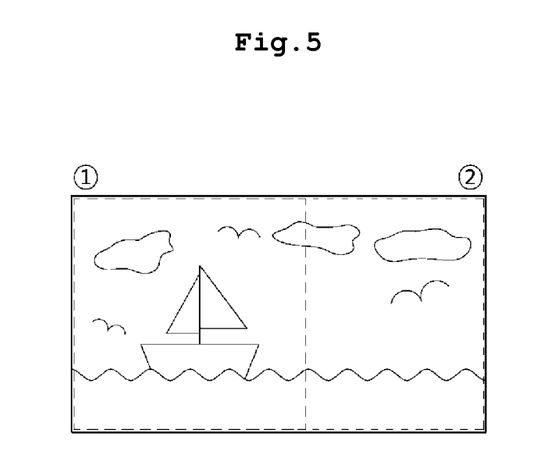
FIG. 5 is a view showing an example of projecting an image by a plurality of projectors.

FIG. 5 is a view showing an example of projecting an image by a plurality of projectors.

FIG. 5 shows an example of projecting an image on one projection surface using two projectors. The image on the left side is projected on the projection surface by projector 1, and the image on the right side is projected on the projection surface by projector 2. An area between the dashed lines is an overlapped area, and the other areas correspond to non-overlapped areas. The example shown in FIG. 5 is a state of applying the method of correcting an image-overlapped area of the present invention, in which an image is played back with a sense of unity in the overlapped area and the non-overlapped area.

Figure 7:
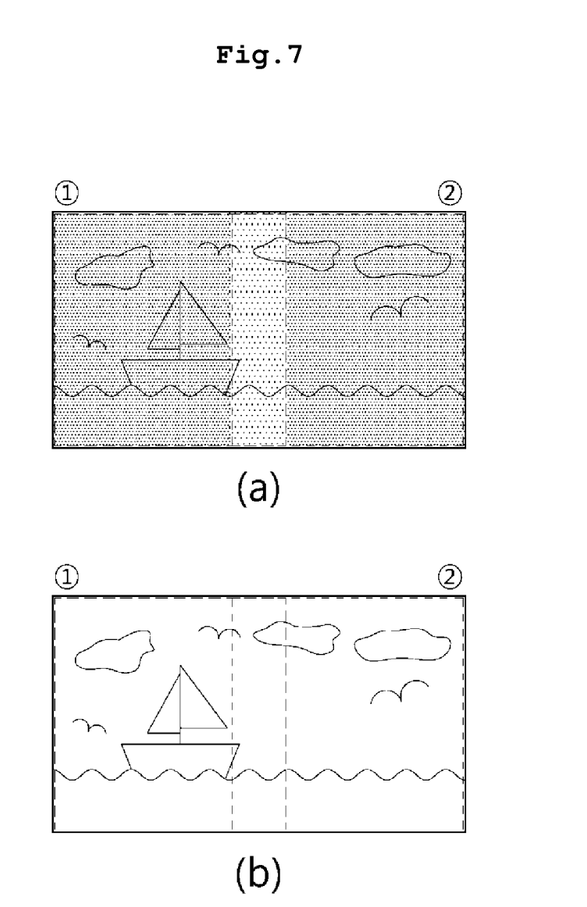
FIG. 7 is a view comparing images displayed on a projection surface before and after applying an embodiment of the present invention.

FIG. 7 is a view comparing images displayed on a projection surface before and after applying an embodiment of the present invention.

FIG. 7(a) shows an image expressed on a projection surface before correction, and it may be confirmed that the overlapped area at the center is brighter than the non-overlapped areas on the left and right sides. When an image is projected using a plurality of projectors, since a user may feel a sense of difference from the image as shown in FIG. 7(a), an integrated image as shown in FIG. 7(b) can be played back if an embodiment of the present invention described above is applied.

The present invention may be implemented in the form of a program for executing the method of correcting an image-overlapped area according to various embodiments described above and includes a computer-readable recording medium for recording the program. Here, the recording medium does not simply mean only a recoding medium of a narrow meaning such as a HDD, a CD, a magnetic disk or the like, but should be considered as a wide meaning including a server, a computer or the like having a storage.

In addition, the present invention includes a device for executing such a program, and, for example, it may be said that a projector control device, a computer, a server and the like may be included in an execution device (master device). In this case, the correction method of the present invention mentioned through the embodiment described above is accomplished in a configuration executing the method, for example, determination and operation are accomplished in a central processing unit (CPU) or the like, and storage of information is accomplished in a storage configuration (e.g., database) in the device. A user interface is provides to a user through a display device or the like, and a user command can be received through an input device.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A method of correcting an image-overlapped area, the method comprising:
   identifying an overlapped area in an image projected by a plurality of projectors;
   determining a difference of at least any one or more of brightness and color of the overlapped area and a non-overlapped area of the image; and
   adjusting a factor among the brightness and the color in which the difference is generated, and
   wherein at the determining, a difference of brightness between the overlapped area and the non-overlapped area is determined, and at the adjusting, brightness of the overlapped area or the non-overlapped area is adjusted based on a brightest overlapped area, and
   wherein at the determining, the difference of brightness is determined when an acquired RGB information or a sum of the RGB information of the image is smaller than a predetermined number so as to determine whether or not a currently projected image is a dark image close to a black color,
   wherein the method further comprises, after the adjusting:
      determining distortion of color according to the adjustment of brightness; and
      re-adjusting brightness of the overlapped area or the non-overlapped area according to the distortion.

2. The method according to claim 1, wherein, at the identifying, an area on a projection surface on which images are overlapped is calculated using image projection area information of each projector stored or calculated in a master device which controls a plurality of projectors.

3. The method according to claim 1, wherein, at the identifying, any one or more of coordinates of an area in which images are overlapped and an overlapped degree of the area are calculated.

4. The method according to claim 1, wherein, at the determining, the difference is determined for each frame of an image.

5. The method according to claim 1, wherein, at the determining, the difference is determined for each pixel of an image.

6. The method according to claim 1, wherein the adjusting includes:
   providing a user with a value resulting from the determining; and
   adjusting at least any one of the brightness and the color of the image according to an adjustment command received from the user.

7. The method according to claim 1, wherein, at the determining, a difference of at least any one of brightness and color of the overlapped area and the non-overlapped area is calculated for each frame, and, at the adjusting, an image projected on a relatively dark area is compensated with the difference of brightness or the difference of image using a result calculated for each frame.

8. The method according to claim 1, wherein, at the adjusting, a blur filtering is applied at a boundary between the overlapped area and the non-overlapped area.

9. The method according to claim 1, wherein, at the adjusting, a transparency variable is reflected in an image projected on the overlapped area by each projector.

10. The method according to claim 9, wherein a chromatic aberration variable is further reflected in addition to the transparency variable.

11. A non-transitory computer-readable recording medium in which a program for performing the method of correcting an image-overlapped area specified in claim 1 is recorded.

12. An apparatus comprising:
   a central processing unit configured to execute a program for performing the method of correcting an image-overlapped area, specified in claim 1; and
   a storage configured to store information.

* * * * *